(12) United States Patent
Rosen

(10) Patent No.: US 10,977,861 B1
(45) Date of Patent: Apr. 13, 2021

(54) INFERRING QUALITY IN POINT CLOUD-BASED THREE-DIMENSIONAL OBJECTS USING TOPOGRAPHICAL DATA ANALYSIS

(71) Applicant: University of South Florida, Tampa, FL (US)

(72) Inventor: Paul Andrew Rosen, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 16/725,051

(22) Filed: Dec. 23, 2019

Related U.S. Application Data

(60) Provisional application No. 62/785,454, filed on Dec. 27, 2018.

(51) Int. Cl.
*G06T 17/20* (2006.01)
*G06T 19/00* (2011.01)

(52) U.S. Cl.
CPC .............. *G06T 17/20* (2013.01); *G06T 19/00* (2013.01); *G06T 2200/24* (2013.01)

(58) Field of Classification Search
CPC ...... G06T 17/20; G06T 19/00; G06T 2200/24
See application file for complete search history.

(56) References Cited

U.S. PATENT DOCUMENTS

| | | | | |
|---|---|---|---|---|
| 2016/0059489 A1* | 3/2016 | Wang | ...................... | H04L 67/16 700/119 |
| 2016/0110917 A1* | 4/2016 | Iverson | ................. | G06T 17/205 345/420 |

OTHER PUBLICATIONS

Edelsbrunner, Herbert, David Letscher, and Afra Zomorodian. "Topological persistence and simplification." Proceedings 41st annual symposium on foundations of computer science. IEEE, 2000. (Year: 2000).*

(Continued)

*Primary Examiner* — Daniel F Hajnik
(74) *Attorney, Agent, or Firm* — Thomas Horstemeyer, LLP

(57) ABSTRACT

Disclosed are various embodiments for inferring quality in point cloud-based three-dimensional objects using topographical data analysis. A first graph is generated representing a three-dimensional model, each vertex in the first graph representing a respective connected component within a layer of the three-dimensional model and each edge in the first graph representing a connection between two respective connected components within two respective layers of the three-dimensional model. A second graph representing negative space associated with the three-dimensional model is also generated, each vertex in the second graph representing a connected component of a negative space region within the layer of the three-dimensional model and each edge in the second graph representing a connection between two respective connected components with two respective layers of the three-dimensional model. A persistent homology analysis is applied to the first graph to determine whether a hole or tunnel exists in each vertex of the first graph. An error with the three-dimensional model can then be identified based at least in part on the first graph, the second graph, and the persistent homology analysis.

18 Claims, 6 Drawing Sheets

(56) References Cited

OTHER PUBLICATIONS

Singh, Gurjeet, Facundo Mémoli, and Gunnar E. Carlsson. "Topological methods for the analysis of high dimensional data sets and 3d object recognition." SPBG 91 (2007): 100. (Year: 2007).*
Wang, Quan, et al. "A Topology Structure Repair Algorithm for Triangular Mesh Model." 2016 13th International Conference on Embedded Software and Systems (ICESS). IEEE, 2016. (Year: 2016).*
Zhou, Qian-Yi, Tao Ju, and Shi-Min Hu. "Topology repair of solid models using skeletons." IEEE Transactions on Visualization and Computer Graphics 13.4 (2007): 675-685. (Year: 2007).*
Pernot, Jean-Philippe, George Moraru, and Philippe Véron. "Repairing triangle meshes built from scanned point cloud." Journal of Engineering Design 18.5 (2007): 459-473.
Zhou, Lu and Weihong Zhang. "Topology optimization method with elimination of enclosed voids." Structural and Multidisciplinary Optimization 60.1 (2019): 117-136.
Telea, Alexandru, and Andrei Jalba. "Voxel-based assessment of printability of 3D shapes." International symposium on mathematical morphology and its applications to signal and image processing. Springer, Berlin, Heidelberg, 2011.
Oropallo, William, et al. "Point cloud slicing for 3-D printing." Computer-Aided Design and Applications 15.1 (2018): 90-97.
Rao, Prahalad K., et al. "Assessment of dimensional integrity and spatial defect localization in additive manufacturing using spectral graph theory." Journal of Manufacturing Science and Engineering 138.5 (2016).
Nelaturi, Saigopal, Walter Kim, and Tolga Kurtoglu. "Manufacturability feedback and model correction for additive manufacturing." Journal of Manufacturing Science and Engineering 137.2 (2015).
Liu, Shutian, et al. "An identification method for enclosed voids restriction in manufacturability design for additive manufacturing structures." Frontiers of Mechanical Engineering 10.2 (2015): 126-137.
Li, Quhao, et al. "Structural topology optimization considering connectivity constraint" Structural and Multidisciplinary Optimization 54.4 (2016): 971-984.
Relvas, Carlos, et al. "Accuracy control of complex surfaces in reverse engineering." International Journal of Precision Engineering and Manufacturing 12.6 (2011): 1035-1042.
Brunton, Alan, et al. "Filling holes in triangular meshes using digital images by curve unfolding." International Journal of Shape Modeling 16.01n02 (2010): 151-171.
Wang, Weiming M., Cédric Zanni, and Leif Kobbelt. "Improved surface quality in 3D printing by optimizing the printing direction." Computer graphics forum. vol. 35. No. 2. 2016.
Xia, Chunhong, and Hui Zhang. "A fast and automatic hole-filling method based on feature line recovery." Computer-Aided Design and Applications 14.6 (2017): 751-759.
Cheng, Siyuan, Siquan Liang, and Xiangwei Zhang. "Repairing Incomplete Measured Data with Haptic Interaction." 2009 2nd International Congress on Image and Signal Processing. IEEE, 2009.
Behandish, Morad, Amir M. Mirzendehdel, and Saigopal Nelaturi. "A Classification of Topological Discrepancies in Additive Manufacturing." Computer-Aided Design 115 (2019): 206-217.
Arrieta, Cristobal, et al. "Quantitative assessments of geometric errors for rapid prototyping in medical applications." Rapid Prototyping Journal (2012).
Robbins, J., et al. "An efficient and scalable approach for generating topologically optimized cellular structures for additive manufacturing." Additive Manufacturing 12 (2016): 296-304.
Haertel, Jan HK, and Gregory F. Nellis. "A fully developed flow thermofluid model for topology optimization of 3D-printed air-cooled heat exchangers." Applied thermal engineering 119 (2017): 10-24.
Nelaturi, Saigopal, and Vadim Shapiro. "Representation and analysis of additively manufactured parts." Computer-Aided Design 67 (2015): 13-23.

* cited by examiner

US 10,977,861 B1

INFERRING QUALITY IN POINT CLOUD-BASED THREE-DIMENSIONAL OBJECTS USING TOPOGRAPHICAL DATA ANALYSIS

CROSS-REFERENCE TO RELATED APPLICATIONS

This application claims priority to, and the benefit of, U.S. Provisional Patent Application No. 62/785,454, entitled "INFERRING QUALITY IN POINT CLOUD-BASED THREE-DIMENSIONAL OBJECTS USING TOPOGRAPHICAL DATA ANALYSIS" and filed on Dec. 27, 2018, which is incorporated by reference as if set forth herein in its entirety.

NOTICE OF GOVERNMENT-SPONSORED RESEARCH

Government sponsorship notice: This invention was made with government support under Grant Number IIS1513616 awarded by the National Science Foundation. The government has certain rights in the invention.

BACKGROUND

Three-dimensional (3D) printing is a popular technology. However, the quality of three-dimensional models can be difficult to assess prior to actually 3D printing an object based on the model. For example, point cloud-based models, such as those generated by 3D scanners, may not represent an object with complete fidelity. This can result 3D models having holes or tunnels where a solid mass should be located, having two or more components connected when they should not be connected, having two or more components not be connected when they should be connected, as well as other problems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for inferring quality in point cloud-based three-dimensional (3D) objects using topographical data analysis. A point-cloud based 3D model can be divided or segmented into a series of slices along the vertical or horizontal axis, according to various embodiments of the present disclosure. The width of each slice may vary according to the particular implementation. For example, the width may be set to the resolution of a corresponding 3D printer, such as the z-axis resolution.

Each slice is analyzed to identify the points that fall within the 3D object. Each discrete or independent group of points may be identified as a connected component. If there are multiple independent groups of points within a slice, then this may indicate that there are multiple connected components within the slice, as further described herein.

Several graphs can then be generated from the series of slices. A first graph may represent the 3D object itself. In this graph, each connected component can be represented as a vertex. Edges between vertices indicate that two connected components adjacent to each other and are connected. A second graph can be similarly created to represent the negative space within and surrounding the 3D object. Voids or other empty spaces within a slice will be represented by a vertex. Edges between vertices in the second graph indicate that two voids are adjacent to each other and part of a larger empty space.

Figure 1:
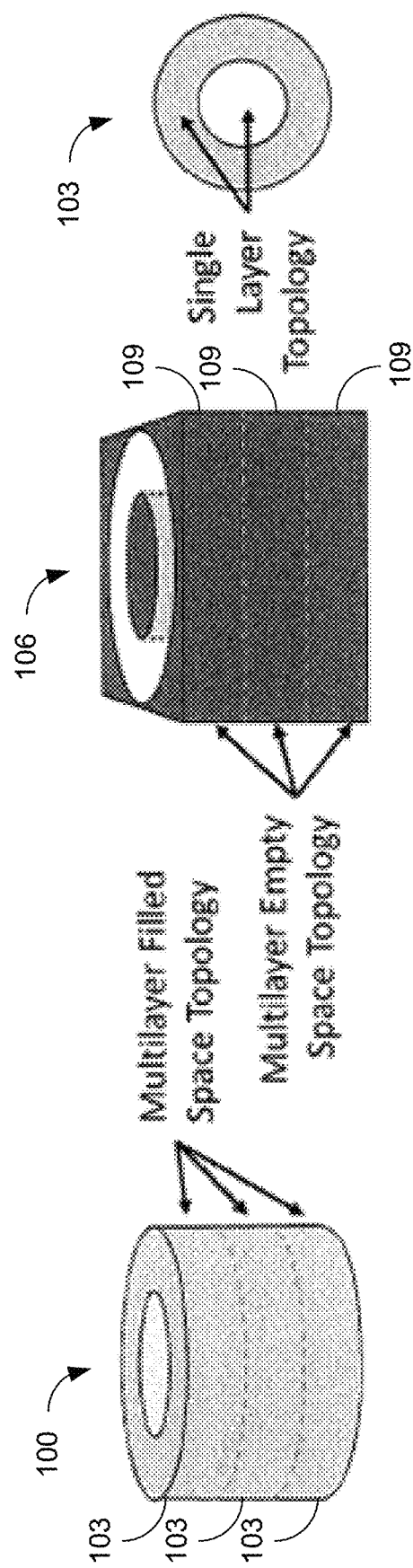
FIG. 1 is a drawing depicting different object topologies used by various embodiments of the present disclosure.

FIGS. 1A-1C are examples of the different types of topologies that can be used by various embodiments of the present disclosure. FIG. 1A depicts an example of an object 100 segmented into multiple positive-space layers 103. FIG. 1B depicts an example of the negative space 106 surrounding the object 100 segmented into multiple negative-space layers 109. FIG. 1C depicts an example of the topology of a positive-space layer 103 when viewed along the z-axis.

Figure 2:
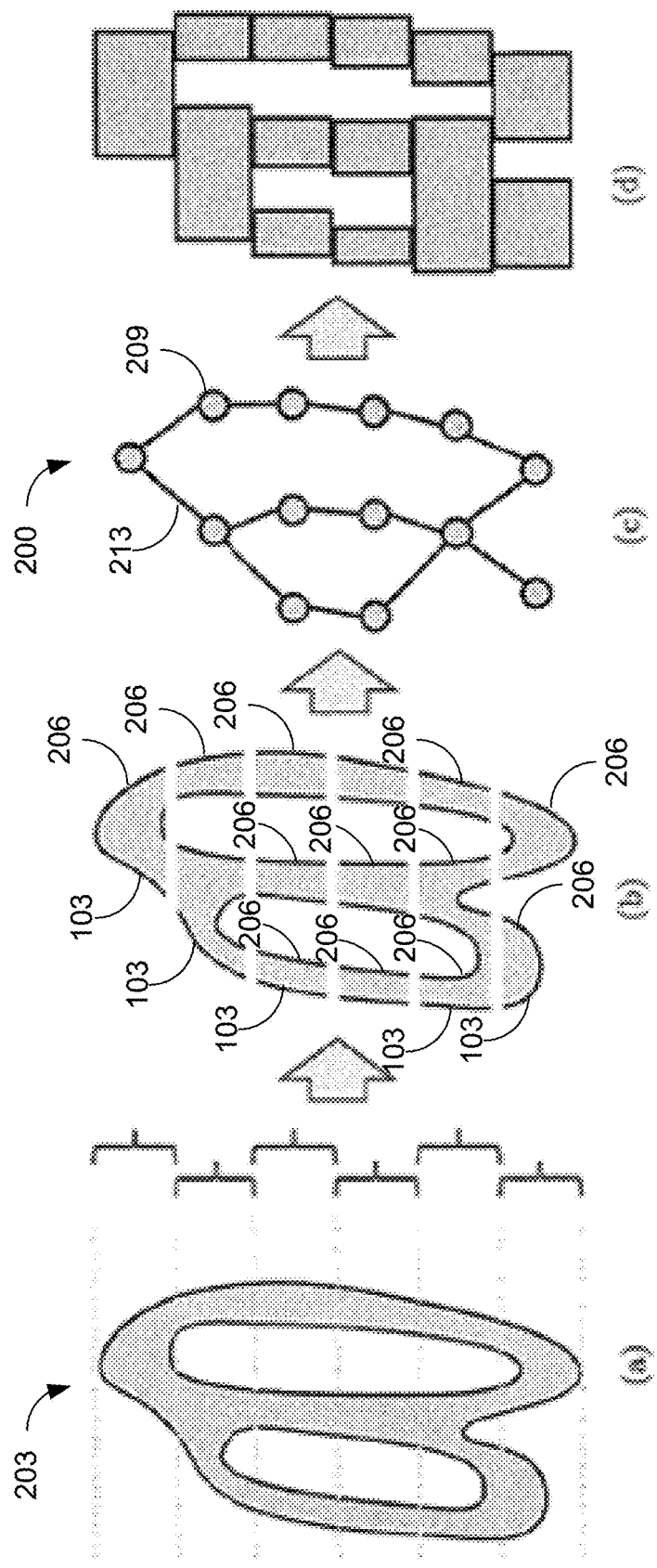
FIG. 2 is a drawing illustrating the creation of a graph representing a three-dimensional model of an object according to various embodiments of the present disclosure.

FIG. 2 depicts a graphical representation of the creation of a graph 200 according to various embodiments of the present disclosure. Although the process depicted is used to generate a graph 200 representing an object 100, a similar process could be used to generate a graph 200 representing the negative space 106 surrounding an object 100. As depicted in the transition from (a) to (b), a three-dimensional (3D) model 203 (e.g., a point cloud-based model) is sliced into multiple segments, such as the depicted positive space layers 103. The width of each segment may be set to a predefined value (e.g., a user specified value representing the z-axis resolution of a 3D printer).

As illustrated in (b) at FIG. 2, each positive space layer 103 may include one or more connected components 206. A connected component 206 includes a contiguous or connected set of points in the 3D model within a positive space layer 103. Each connected component 206 may be represented as a vertex 209 of a graph 200, as illustrated in (c). Edges 213 of the graph 200 represent connected components 206 of adjacent positive-space layers 103.

Figure 3:
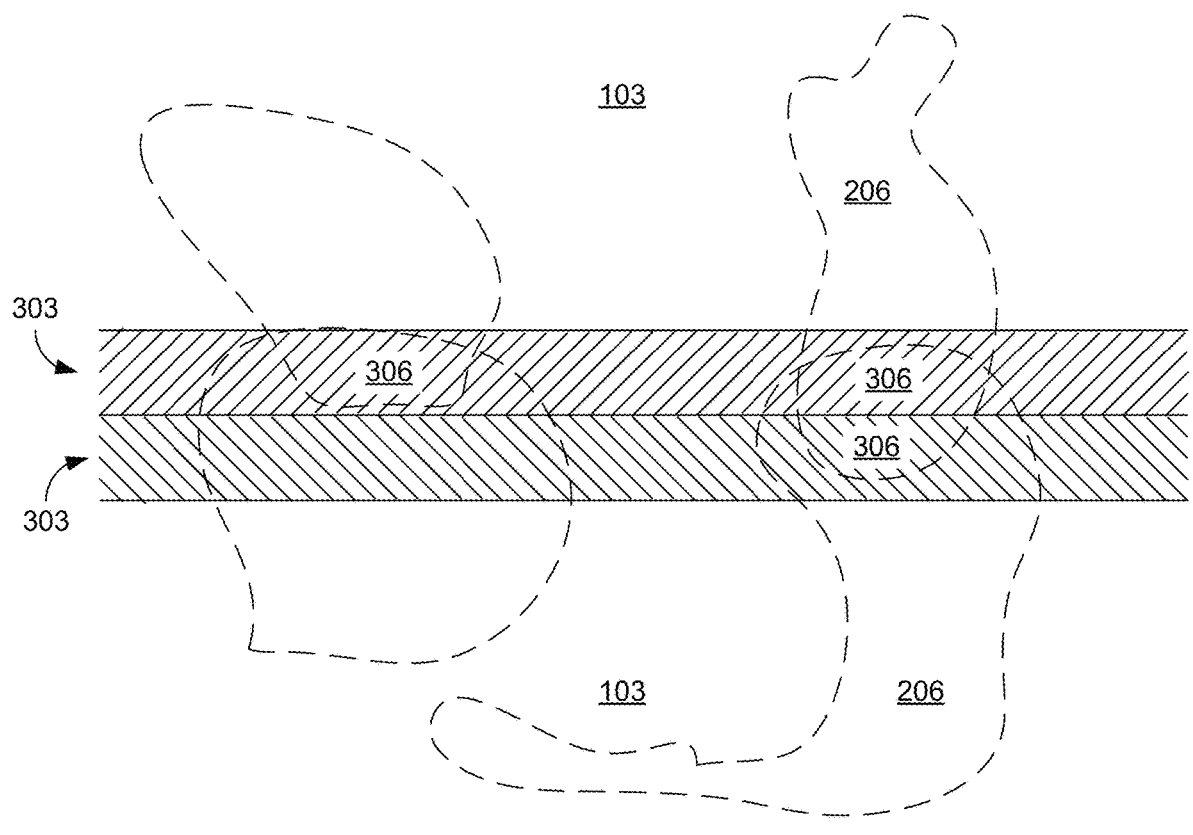
FIG. 3 is a graphical representation of the process for determining whether two connected components of a three-dimensional model of an object are connected to each other.

FIG. 3 depicts a graphical representation of the process for determining whether two connected components 206 in adjacent positive-space layers 103 are connected to each other. Each positive-space layer 103 has a predefined width. However, each positive-space layer 103 may also have a buffer zone 303. Where connected components 206 from adjacent positive-space layers 103 include points in an overlapping area 306 of a buffer zone 303, then the connected components 206 can be determined to connect to each other. This connection may be represented by an edge in the graph 200.

It should be noted that similar processes can be used to map and model the negative space 106 surrounding an object 100. For example, points may be added to the negative space 106 surrounding or within a 3D model.

Contiguous or connected sets of points within the negative space may be grouped together in negative-space layers 109. These groupings may be represented as vertices and groupings in adjacent negative-space layers 109 can be represented using edges to show that they are connected.

Figure 4:
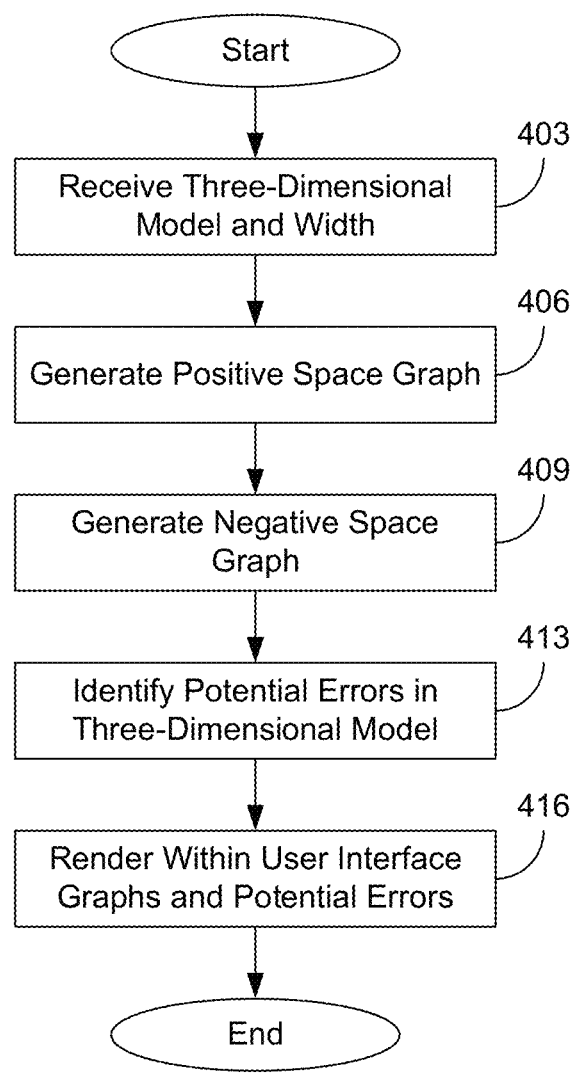
FIG. 4 is a flowchart illustrating one example of functionality implemented as portions of an application or method to various embodiments of the present disclosure.

FIG. 4 is a flowchart representing a method according to various embodiments of the present disclosure. The flowchart of FIG. 4 may be considered as a method or sequence of steps performed by a computer according to various embodiments of the present disclosure. Likewise, the flowchart of FIG. 4 may be considered as a description of logical blocks of an application executed by the computer according to various embodiments of the present disclosure.

Beginning at step 403, a three-dimensional (3D) model 203 and a segment width are received. For example, a user may select or identify a 3D model 203 using a user interface and input or select a segment width with the user interface. The 3D model 203 may be a point cloud-based model and the segment width may represent a resolution of a 3D printer (e.g., the z-axis resolution).

Next at step 406, a graph 200 representing the 3D model 203 (e.g., a positive-space graph 200) is generated. To generate the positive space graph 200, the three-dimensional model 203 is divided into multiple positive-space layers 103 with the predefined width. Any connected components 206 within a positive space-layer 103 are identified and a vertex 209 is created to represent each connected component 206. To identify which connected components 206 in adjacent positive-space layers 103 connect to each other, it may be determined whether the connected components 206 extend into a buffer zone 303. If an overlapping area 306 for two connected components 206 exists within a buffer zone 303, the then connected components 206 may be considered to connect to each other. Accordingly, an edge 213 may be created between the respective vertices 209 of the graph representing the two connected components 206.

In addition, persistent homology approaches may be used to identify the contours of individual connected components 206. For example, persistent homology approaches may be used to identify holes, tunnels or other voids within a connected component 206. This information may be stored within the vertex 209 of the graph 200 representing the respective connected component 206.

Then at step 409, a graph 200 representing the negative space 106 within or surrounding the 3D model 203 can be generated. To generate such a graph 200, a series of points may be created in the negative space 106 surrounding the 3D model 203. These points in the negative space 106 of the 3D model 203 can then be treated as a model or an object, allowing the same process as described in step 406 to be used to create a graph representing the negative space 106 within or surrounding the 3D model 203.

Moving on to step 413, potential errors in the three-dimensional model 203 can be identified according to various criteria. For example, invisible holes or voids within the three-dimensional model 203 may be identified, as indicated by the presence of multiple negative-space graphs 200 instead of a single negative space graph 203. As another example, a series of vertices 209 in a positive-space graph 200 may be indicated as containing one or more holes. If the series of vertices 209 does not terminate with vertices 209 without any holes or tunnels, this could indicate a hole or tunnel continuing the length, width, or other distance of the three-dimensional model 203. Other errors may also be identified according to various criteria.

Next at step 416, the results may be rendered or displayed within a user interface. For example, the graphs 200 may be presented to the user, with problematic regions highlighted to indicate that the user should further investigate these sections of the model 203. Other renditions or representations may also be made as appropriate for the various embodiments of the present disclosure.

Figure 5:
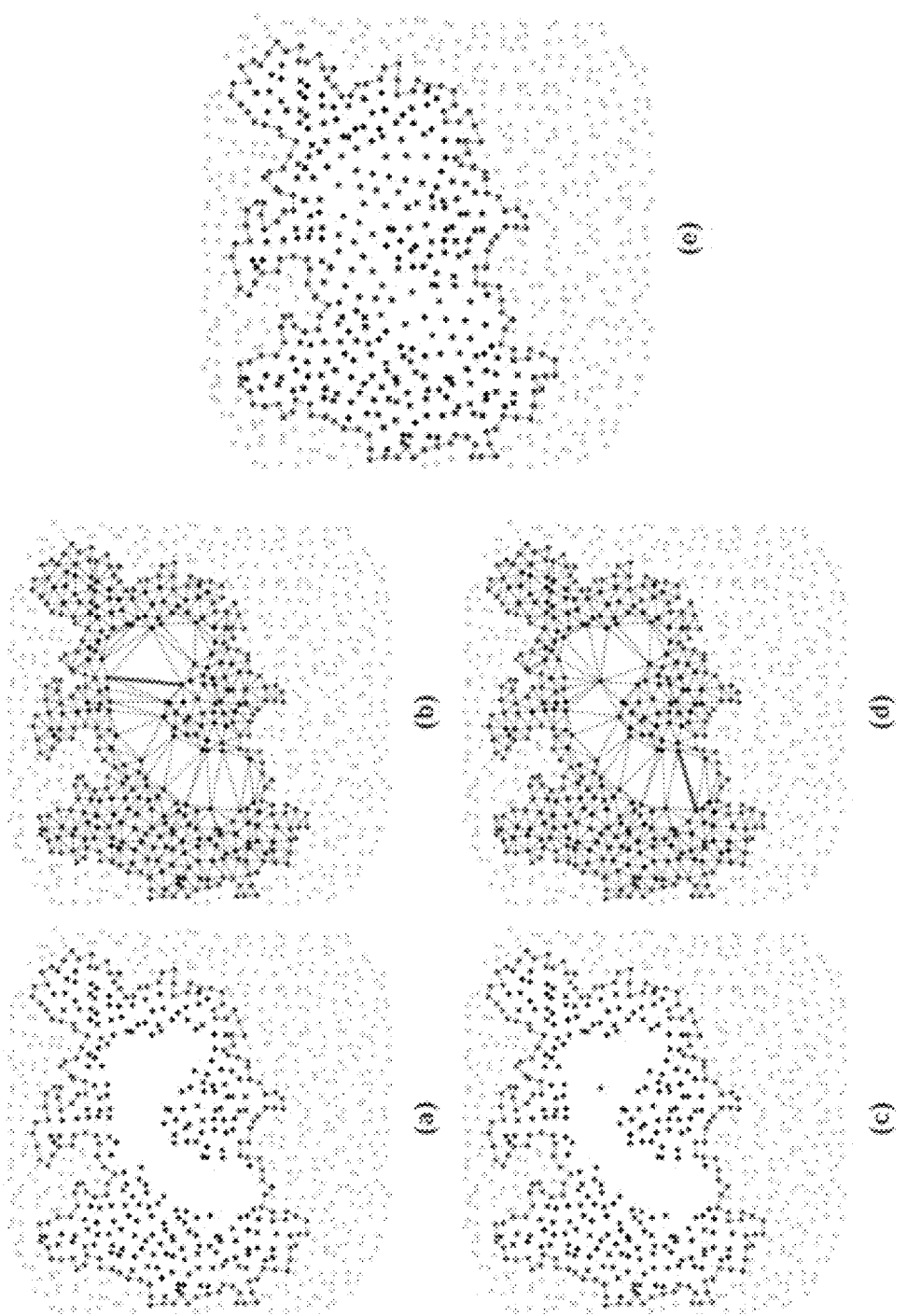
FIG. 5 provides a graphical representation of a process for a topological repair of point cloud-based three-dimensional printed objects.

FIG. 5 depict a graphical representation of a method or approach for performing topological repairs of point cloud-based objects. Once problematic holes are discovered in point cloud-based data sets, as previously discussed, a user may select an H1 feature (e.g., a hole in a slice as found by persistent homology), and have the hole filled with new interpolated points.

A by-product of calculating the persistent homology, and using a boundary matrix reduction in particular, is an object known as a representative generator. The generator describes a set of simplices that capture a topological feature. For H1, this generator is a series of edges that form a closed loop. The representative generator is not guaranteed to be compact or unique, though methods to find the most compact generator exist. At (a), an example is shown—given a set of points, the generator, as identified by persistent homology, is the series of edges surrounding the hole (missing points) in the middle of the dataset.

Given that one is working with a single slice of data, the procedure can be treated as a two-dimensional problem moving forward, making the generator a two-dimensional non-convex polygon. For the next step, the points on the interior, inclusive of the boundary, of the polygon are identified. The result is also illustrated in (a).

Once the interior points are identified, the interior of the non-convex polygon is triangulated. One example of a triangulation technique that may be appropriate is Delaunay Triangulation, which has a benefit of guaranteeing the shape of triangles to ensure new points created for the dataset are well distributed. Step (b) shows an example of the resulting triangulation.

New points can then be added to the dataset. First, the longest edge in the Delaunay triangulation is selected, an example of which is illustrated in step (b). Next, a new point is inserted at the midpoint of the edge, as illustrated in step (c). Finally, the polygon is re-triangulated, for example by using an incremental Delaunay algorithm to efficiently update the existing triangulation with the new point, as illustrated in step (d). This process can be repeated as long as the length of the longest edge of the Delaunay triangulation is above a user-defined threshold, which would typically be defined based at least in part on the resolution of a three-dimensional printer. An example of a final repaired point cloud is illustrated at step (e).

Figure 6:
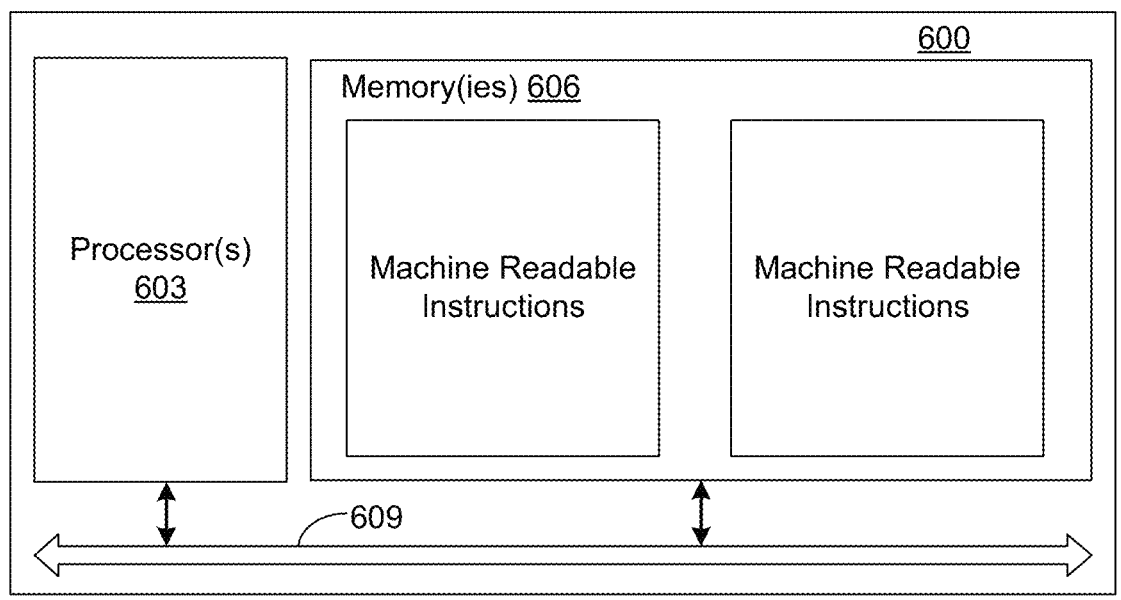
FIG. 6 is a schematic block diagram that provides one example illustration of a computing device used to implement various embodiments of the present disclosure.

With reference to FIG. 6, shown is a schematic block diagram a computing device 600. The computing device 600 includes at least one processor circuit, for example, having a processor 603 and a memory 606, both of which are coupled to a local interface 609. To this end, the computing device 600 may include, for example, at least one server computer or like device. The local interface 609 may include, for example, a data bus with an accompanying address/control bus or other bus structure as can be appreciated.

Stored in the memory 606 are both data and several components that are executable by the processor 603. In particular, stored in the memory 606 and executable by the processor 603 are machine-readable instructions that can cause the computing device 600 to implement various embodiments of the present disclosure, including the functionality described in FIG. 3. Also stored in the memory 606 may be a data store and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606. The local interface 609 may include additional systems designed to coordinate this communication, including, for example, performing load balancing. The processor 603 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

FIG. 3 depicts an example embodiment of the present disclosure. If embodied in software, each block in FIG. 3 may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 603 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as, for example, a processor 603 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   generate a first graph representing a three-dimensional model, each vertex in the first graph representing a respective connected component within a layer of the three-dimensional model and each edge in the first graph representing a connection between two respective connected components within two respective layers of the three-dimensional model;
   generate a second graph representing negative space associated with the three-dimensional model, each vertex in the second graph representing a connected component of a negative space region within the layer of the three-dimensional model and each edge in the second graph representing a connection between two respective connected components with two respective layers of the three-dimensional model;
   apply a persistent homology analysis to the first graph to determine whether a hole or tunnel exists in each vertex of the first graph; and
   identify an error with the three-dimensional model based at least in part on the first graph, the second graph, and the persistent homology analysis.

2. The system of claim 1, wherein the machine-readable instructions further cause the computing device to repair the error.

3. The system of claim 2, wherein the machine-readable instructions that cause the computing device to repair the error further cause the computing device to at least:
   identify a two-dimensional, non-convex polygon that represents the hole or tunnel;
   triangulate an interior of the non-convex polygon; and
   add additional data points within the interior of the non-convex polygon based at least in part on triangulating the interior of the non-convex polygon.

4. The system of claim 1, wherein the machine-readable instructions that cause the computing device to generate the first graph further cause the computing device to at least:
   insert a plurality of points into the negative space region of the three-dimensional model;
   separate the three-dimensional model into a series of layers, each layer in the series of layers having a predefined width;
   identify a set of connected components in each layer in the series of layers, each connected component in the set of connected components representing at least a portion of the plurality of points in the negative space region of the three-dimensional model; and
   for each connected component in the set of components in a respective layer, identify a collection of connected components that touch the connected component.

5. The system of claim 1, wherein the machine-readable instructions that cause the computing device to generate the first graph further cause the computing device to at least:
   separate the three-dimensional model into a series of layers, each layer in the series of layers having a predefined width;
   identify a set of connected components in each layer in the series of layers; and
   for each connected component in the set of components in a respective layer, identify a collection of connected components that touch the connected component.

6. The system of claim 5, wherein machine readable instructions further cause the computing device to at least:
   receive an input from a user interface specifying the predefined width, the predefined width being substantially equal to a z-axis resolution of a three-dimensional printer; and
   set the predefined width equal to the input specifying the predefined width.

7. A method, comprising:
   generating a first graph representing a three-dimensional model, each vertex in the first graph representing a respective connected component within a layer of the three-dimensional model and each edge in the first graph representing a connection between two respective connected components within two respective layers of the three-dimensional model;
   generating a second graph representing negative space associated with the three-dimensional model, each vertex in the second graph representing a connected component of a negative space region within the layer of the three-dimensional model and each edge in the second graph representing a connection between two respective connected components with two respective layers of the three-dimensional model;
   applying a persistent homology analysis to the first graph to determine whether a hole or tunnel exists in each vertex of the first graph; and identifying an error with the three-dimensional model based at least in part on the first graph, the second graph, and the persistent homology analysis.

8. The method of claim 7, further comprising repairing the error in the three-dimensional model.

9. The method of claim 8, wherein repairing the error in the three-dimensional model further comprises:
- identifying a two-dimensional, non-convex polygon that represents the hole or tunnel;
- triangulating an interior of the non-convex polygon; and
- adding additional data points within the interior of the non-convex polygon based at least in part on triangulating the interior of the non-convex polygon.

10. The method of claim 7, wherein generating the second graph further comprises:
- inserting a plurality of points into the negative space region of the three-dimensional model;
- separating the three-dimensional model into a series of layers, each layer in the series of layers having a predefined width;
- identifying a set of connected components in each layer in the series of layers, each connected component in the set of connected components representing at least a portion of the plurality of points in the negative space region of the three-dimensional model; and
- for each connected component in the set of components in a respective layer, identifying a collection of connected components that touch the connected component.

11. The method of claim 7, wherein generating the first graph further comprises:
- separating the three-dimensional model into a series of layers, each layer in the series of layers having a predefined width;
- identifying a set of connected components in each layer in the series of layers; and
- for each connected component in the set of components in a respective layer, identifying a collection of connected components that touch the connected component.

12. The method of claim 11, further comprising:
- receiving an input from a user interface specifying the predefined width, the predefined width being substantially equal to a z-axis resolution of a three-dimensional printer; and
- setting the predefined width equal to the input specifying the predefined width.

13. A non-transitory computer-readable medium comprising machine-readable instructions that, when executed by the processor, cause the computing device to at least:
- generate a first graph representing a three-dimensional model, each vertex in the first graph representing a respective connected component within a layer of the three-dimensional model and each edge in the first graph representing a connection between two respective connected components within two respective layers of the three-dimensional model;
- generate a second graph representing negative space associated with the three-dimensional model, each vertex in the second graph representing a connected component of a negative space region within the layer of the three-dimensional model and each edge in the second graph representing a connection between two respective connected components with two respective layers of the three-dimensional model;
- apply a persistent homology analysis to the first graph to determine whether a hole or tunnel exists in each vertex of the first graph; and
- identify an error with the three-dimensional model based at least in part on the first graph, the second graph, and the persistent homology analysis.

14. The non-transitory computer-readable medium of claim 13, wherein the machine-readable instructions further cause the computing device to repair the error.

15. The non-transitory computer-readable medium of claim 14 wherein the machine-readable instructions that cause the computing device to repair the error further cause the computing device to at least:
- identify a two-dimensional, non-convex polygon that represents the hole or tunnel;
- triangulate an interior of the non-convex polygon; and
- add additional data points within the interior of the non-convex polygon based at least in part on triangulating the interior of the non-convex polygon.

16. The non-transitory computer-readable medium of claim 13, wherein the machine-readable instructions that cause the computing device to generate the first graph further cause the computing device to at least:
- insert a plurality of points into the negative space region of the three-dimensional model;
- separate the three-dimensional model into a series of layers, each layer in the series of layers having a predefined width;
- identify a set of connected components in each layer in the series of layers, each connected component in the set of connected components representing at least a portion of the plurality of points in the negative space region of the three-dimensional model; and
- for each connected component in the set of components in a respective layer, identify a collection of connected components that touch the connected component.

17. The non-transitory computer-readable medium of claim 13, wherein the machine-readable instructions that cause the computing device to generate the first graph further cause the computing device to at least:
- separate the three-dimensional model into a series of layers, each layer in the series of layers having a predefined width;
- identify a set of connected components in each layer in the series of layers; and
- for each connected component in the set of components in a respective layer, identify a collection of connected components that touch the connected component.

18. The non-transitory computer-readable medium of claim 17, wherein the machine-readable instructions further cause the computing device to at least:
- receive an input from a user interface specifying the predefined width, the predefined width being substantially equal to a z-axis resolution of a three-dimensional printer; and
- set the predefined width equal to the input specifying the predefined width.

* * * * *